(12) United States Patent
De Azevedo et al.

(10) Patent No.: US 11,511,217 B2
(45) Date of Patent: Nov. 29, 2022

(54) FILTER AND METHOD OF FABRICATING SAME

(71) Applicant: Mahle International GmbH, Stuttgart (DE)

(72) Inventors: Edson Valdomiro De Azevedo, Rochester Hills, MI (US); Fernando Jun Yoshino, Rochester, MI (US)

(73) Assignee: Mahle International GmbH

( * ) Notice: Subject to any disclaimer, the term of this patent is extended or adjusted under 35 U.S.C. 154(b) by 0 days.

(21) Appl. No.: 17/028,277

(22) Filed: Sep. 22, 2020

(65) Prior Publication Data

US 2022/0088508 A1 Mar. 24, 2022

(51) Int. Cl.
*B01D 29/13* (2006.01)
*B01D 29/11* (2006.01)
*B01D 35/00* (2006.01)

(52) U.S. Cl.
CPC ............ *B01D 29/13* (2013.01); *B01D 29/111* (2013.01); *B01D 35/005* (2013.01); *B01D 2201/295* (2013.01); *B01D 2201/4061* (2013.01)

(58) Field of Classification Search
CPC .... B01D 27/08; B01D 27/103; B01D 27/106; B01D 27/148; B01D 35/18; B01D 35/30; B01D 2201/295; B01D 2201/316; B01D 29/21; B01D 29/232; B01D 35/16; B01D 35/153; B01D 2201/291; B01D 2201/305; B01D 2201/347; F01M 5/002; F01M 11/03; F01M 2011/036

See application file for complete search history.

(56) References Cited

U.S. PATENT DOCUMENTS

| | | | |
|---|---|---|---|
| 3,312,350 | A | 4/1967 | Kasten |
| 3,465,883 | A | 9/1969 | Jumper |
| 3,502,218 | A | 3/1970 | Tuffnell et al. |
| 4,497,714 | A | 2/1985 | Harris |
| 4,502,955 | A | 3/1985 | Schaupp |

(Continued)

FOREIGN PATENT DOCUMENTS

| | | |
|---|---|---|
| DE | 3903675 A1 | 8/1990 |
| DE | 3941996 A1 | 6/1991 |

(Continued)

OTHER PUBLICATIONS

International Search Report dated Dec. 6, 2010 for PCT/EP2010/062585.
European Search Report dated Jun. 14, 2013 for EP10751600.7.

*Primary Examiner* — Waqaas Ali
(74) *Attorney, Agent, or Firm* — Fishman Stewart PLLC (57) ABSTRACT

A filter element having a central axis includes a first endplate having a first central aperture, a second endplate having a second central aperture, a filter material positioned between the first endplate and the second endplate and having an axial passageway extending therebetween and along the central axis, the axial passageway axially aligned with the first central aperture and the second central aperture. The filter element includes a plurality of fingers attached to the first endplate and positioned circumferentially about the central axis and extending parallel therewith, each finger having a lip that extends from a surface of its respective finger for axial engagement with a respective nodule, of a plurality of nodules, of a filter head.

16 Claims, 10 Drawing Sheets

(56) References Cited

U.S. PATENT DOCUMENTS

| | | |
|---|---|---|
| 4,619,764 A | 10/1986 | Church et al. |
| 5,089,129 A | 2/1992 | Brigman |
| 5,548,893 A | 8/1996 | Koelfgen |
| 5,814,215 A | 9/1998 | Bruss et al. |
| 6,139,738 A | 10/2000 | Maxwell |
| 6,251,273 B1 | 6/2001 | Jawurek et al. |
| 6,409,804 B1 | 6/2002 | Cook et al. |
| 6,706,181 B1 | 3/2004 | Baumann et al. |
| 6,835,305 B1 | 12/2004 | Baumann et al. |
| 6,936,169 B2 | 8/2005 | Baumann et al. |
| 7,237,681 B2 | 7/2007 | Brieden et al. |
| 7,527,739 B2 | 5/2009 | Jiang et al. |
| 8,673,138 B2 | 3/2014 | Braunheim |
| 9,108,125 B2 | 8/2015 | Braunheim |
| 9,205,355 B2 | 12/2015 | Deschamps et al. |
| 9,320,992 B2 | 4/2016 | Braunheim |
| 9,333,448 B2 | 5/2016 | Braunheim et al. |
| 9,810,373 B2 | 11/2017 | Braunheim |
| 10,035,090 B2 | 7/2018 | Kollmann et al. |
| 10,371,108 B2 | 8/2019 | Braunheim |
| 10,406,462 B2 | 9/2019 | Kollmann et al. |
| 10,556,199 B2 | 2/2020 | Luchesi De Almeida et al. |
| 10,576,402 B2 | 3/2020 | Luchesi De Almeida et al. |
| 10,646,811 B2 | 5/2020 | Luchesi De Almeida et al. |
| 2005/0274664 A1 | 12/2005 | Stoehr et al. |
| 2007/0084776 A1 | 4/2007 | Sasur |
| 2007/0240390 A1 | 10/2007 | Becker et al. |
| 2008/0024719 A1 | 1/2008 | Kamishita et al. |
| 2009/0008321 A1 | 1/2009 | Tanner et al. |
| 2011/0017649 A1 | 1/2011 | Sasur |
| 2011/0089091 A1 | 4/2011 | Grass et al. |
| 2017/0252684 A1* | 9/2017 | Goedecke ............... B01D 29/13 |
| 2017/0296950 A1* | 10/2017 | Benner .................. B01D 35/30 |
| 2019/0046903 A1* | 2/2019 | Boden ..................... F01M 1/10 |
| 2020/0179843 A1 | 6/2020 | Amaral et al. |

FOREIGN PATENT DOCUMENTS

| | | |
|---|---|---|
| DE | 19707132 A1 | 8/1998 |
| DE | 19904981 A1 | 8/2000 |
| DE | 19951085 A1 | 4/2001 |
| DE | 10308427 A1 | 9/2004 |
| DE | 102005000658 A1 | 7/2006 |
| DE | 102005015194 A1 | 10/2006 |
| DE | 202006006084 U1 | 8/2007 |
| DE | 202006017305 U1 | 3/2008 |
| DE | 102007048550 A1 | 4/2008 |
| DE | 102007009352 A1 | 8/2008 |
| DE | 202007001227 U1 | 8/2008 |
| DE | 102008011616 A1 | 9/2008 |
| DE | 102009024699 A1 | 12/2010 |
| DE | 102012000876 C5 | 10/2014 |
| DE | 102016124587 A1 | 6/2018 |
| DE | 102018221257 A1 | 6/2020 |
| DE | 102018221259 A1 | 6/2020 |
| DE | 102018221260 A1 | 6/2020 |
| DE | 102018221261 A1 | 6/2020 |
| EP | 0260069 A2 | 3/1988 |
| EP | 0385113 A2 | 9/1990 |
| EP | 0405447 A2 | 1/1991 |
| EP | 1233173 A2 | 8/2002 |
| EP | 1695753 A1 | 8/2006 |
| JP | H7217577 A | 8/1995 |
| WO | 0110533 A1 | 2/2001 |
| WO | 20058123216 A1 | 3/2005 |
| WO | 2006105755 A1 | 10/2006 |
| WO | 2009080455 A1 | 7/2009 |
| WO | 2017108835 | 6/2017 |
| WO | 2018050232 | 3/2018 |
| WO | 2018050233 | 3/2018 |
| WO | 2018050236 | 3/2018 |
| WO | 2018050237 | 3/2018 |
| WO | 2018050238 | 3/2018 |

* cited by examiner

FIG. 10

FILTER AND METHOD OF FABRICATING SAME

TECHNICAL FIELD

The present disclosure relates to a fluid filter for an internal combustion engine of a motor vehicle.

BACKGROUND

Fluid filters can be found in any motor vehicle that includes an internal combustion engine, and they serve for filtering out different contaminants from the fluids, such as fuel, oil, lubrication.

Particulates, for instance, can be introduced into the fuel stream in a variety of ways, such as dirt or rust while filling the tank, or from the fuel itself if from an unfiltered source. Particulates can be abrasive and can cause rapid wear and failure of engine components, such as the fuel pump and injectors. Filters often therefore typically include a particulate filter element (i.e., paper), which allows passage of the fuel while capturing the particulate matter.

For example, fluid filters are typically changed at regular intervals during the life of the engine as routine maintenance. However, routine changing of filters can inadvertently damage the engine if not installed properly. Some filter designs include insertion devices to aid in the insertion of filters into a housing. For instance, fluid filters may include an axially protruding pin that is used to close a run-off channel. The pin fits snugly within the channel and typically includes an O-ring or other sealing element to prevent drainage during engine use. The filter may be installed by positioning the filter within its housing, and the pin is then guided via a circumferential or helical ramp, on which the pin slides, until the pin finds the channel. The pin plugs the channel during operation of the filter, but when changing the filter, fluid access to the channel occurs when the pin is removed from the channel (i.e., by pulling out the filter from its cavity). Thus, installation of such a filter includes proper alignment of the pin with the channel. In some known designs the pin is visually aligned with the channel. However, it may be difficult to see or "feel" such alignment, and if a proper technique is not developed, the pin or filter may be damaged during installation.

Known designs include placement of a filter within an enclosure, or housing, which may include the afore-described channel and its corresponding pin. Typically, the filter is placed within the housing and is engaged in such a fashion that passageways for the flow of oil, both contaminated and then filtered, are formed or aligned with one another via, for instance, a ramp as described. When in operation, oil thereby is caused to flow into the filter where it passes through filter elements and then passes from back through the housing and to the engine as filtered oil.

Typically, installation includes a holding mechanism such as a housing cover that passes over a top of the filter to hold the filter while it is installed into the housing. The housing cover may include threads that engage with the housing, so that installation of the filter includes first inserting the filter into the cover, inserting the filter (via the cover) so that the pin engages with the ramp during rotation and, when the pin engages the hole, rotation of the filter ceases while the filter cover is screwed into the housing to seal off a cavity in which the filter is positioned. This operation often includes a mechanism that allows for relative rotation between the filter and the cover, allowing for the cover to be screwed in while the filter remains stationary.

In some designs, however, pins are not desired or necessary for operation of, and during removal (and maintenance of) the filter. As such, the need to rotationally engage the filter with its base and within the housing may be reduced. In so doing, however, the known apparatus and method may not suffice to both locate and contain the filter within its housing, or for when it engages with the passageways through which the oil passes into and out of the filter.

In addition, in some designs the filter may be unknowingly installed upside-down and the housing fitted over the filter. In such an arrangement, while the components may fit together and the cover or housing installed, the mechanic or installer may do so unwittingly.

In other instances, the filter may be installed forcibly, with the mechanic or installer finding that resistance to installation may be overcome by adding additional force to either the filter or the housing, which can force the components together and cause damage. Damage may be imparted to the filter, the housing, and/or the engine itself. Thus, although the mechanic may realize the error, it may be too late and the damage has already occurred.

As such, there is a need to for an improved design and method of installing a fuel filter.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Figure 1A:
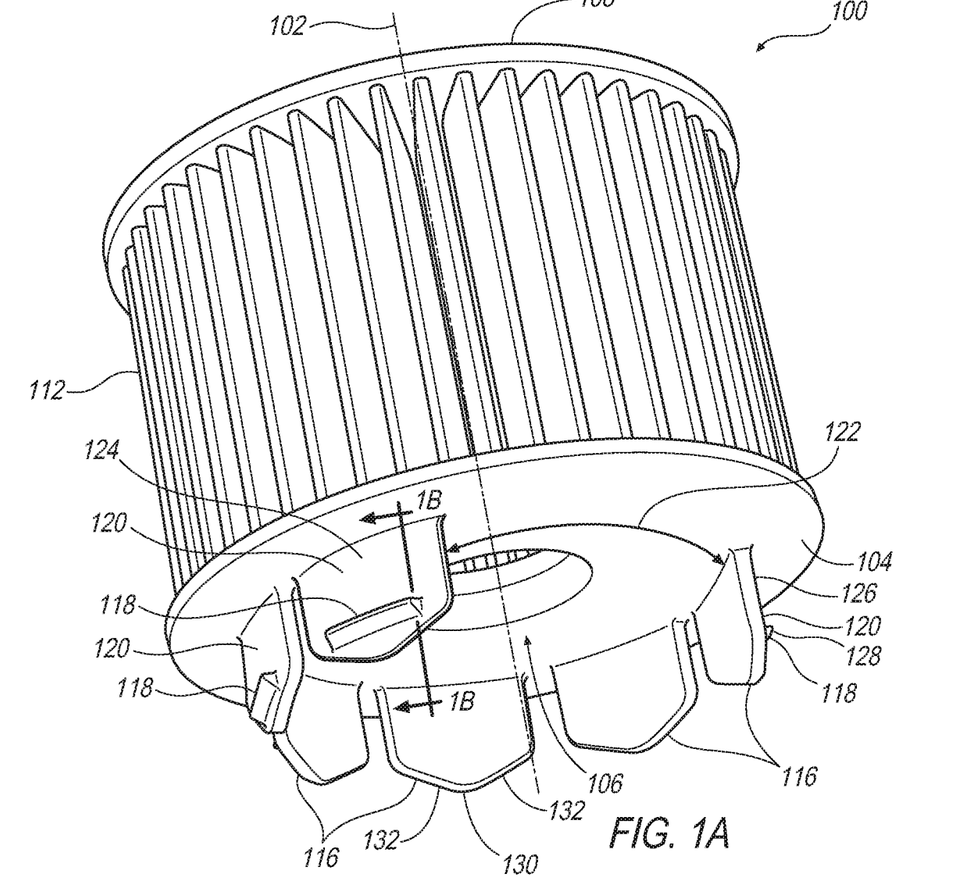
FIG. 1A shows a bottom perspective view of a filter element.
Figure 2:
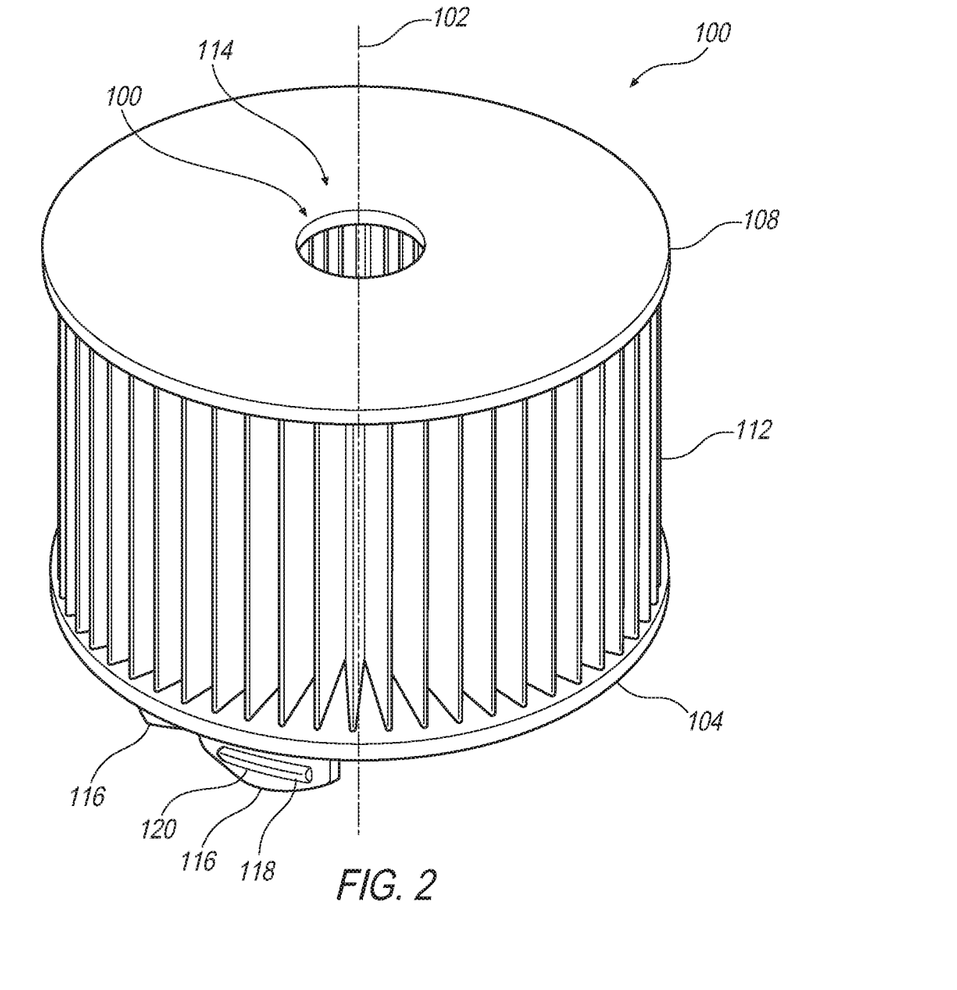
FIG. 2 shows a top perspective view of the filter element of FIG. 1A.

FIG. 1A shows a bottom perspective view of a filter element 100 and FIG. 2 shows a top perspective view of filter element 100. Referring to FIGS. 1 and 2, filter element 100 include a central axis 102. Filter element 100 includes a first endplate 104 having a first central aperture 106, and a second endplate 108 having a second central aperture 110.

Filter element 100 includes a filter material 112 positioned between first endplate 104 and second endplate 108. An axial passageway 114 extends therebetween and along central axis 102. Axial passageway 114 axially aligned with first central aperture 106 and second central aperture 110. A plurality of fingers 116 are attached to first endplate 104 and positioned circumferentially about central axis 102 and extending parallel therewith. Each finger 116 having a lip 118 that extends from a surface 120 of its respective finger 116. The lip 118 of reach respective finger 116 extends radially outward.

Figure 3A:
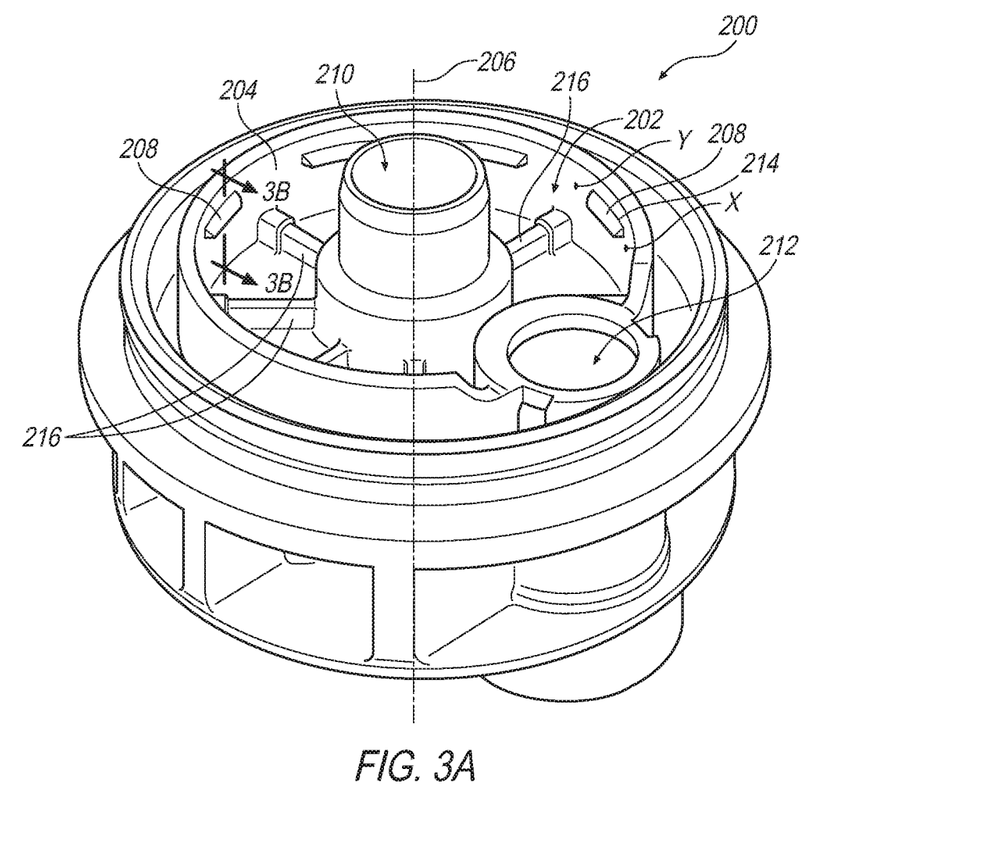
FIG. 3A shows a perspective view of a filter head.

FIG. 3A shows a perspective view of a filter head 200. Filter head 200 includes a cavity 202 that is partially formed by a wall 204 that extends circumferentially about central axis 206, which corresponds with central axis 102 of filter element 100 when filter element 100 is attached thereto. A plurality of nodules 208 extend from wall 204. Lips 118 of each finger 116 engage axially with a respective nodule 208 when filter element 100 is properly installed on filter head 200.

Filter head 200 includes a central aperture or passageway 210, and an axially offset passageway or protuberance 212, which serve as inlet and outlet paths for a liquid to be filtered, such as fuel. As is evident in FIG. 3A, axially offset passageway 212 falls in a portion of the circumferential wall 204, on which nodules 208 are mounted. As such, and referring back to FIG. 1A, the pattern of fingers 116 are interrupted so that a circumferential gap 122 is formed between a first end finger 124 and a second end finger 126. Circumferential gap 122 thereby spans the position of axially offset passageway 212 when filter element 100 is installed on filter head 200.

Due to the axial interference between lips 118 and nodules 208, filter element 100 is locked into filter head 200 when the fingers and nodules are aligned with one another. Due to the rigid nature of at least fingers 116 and lips 118, when filter element 100 is properly aligned with filter head 200, removal is prevented and axial extraction to forcibly remove filter element 100 would result in distortion, if not fracturing, of fingers 116, lips 118, and nodules 208. Thus, to insert and extract filter element 100 to and from filter head 200, a twisting action is employed and filter element 100 is rotated slightly such that lips 118 fall between nodules 208. Due to the positioning of axially offset passageway 212 and circumferential gap 122, it is contemplated that circumferential gap 122 is properly sized such that filter element 100 may be installed having its fingers 116 to one rotational side, or the other rotational side, of their respective nodules 208. As an example, consider that the illustrated example includes six nodules 208 and six fingers 116. Second end finger 126, illustrated above, corresponds with a nodule indicated as nodule 214 of filter head 200. When second end finger 126 is aligned axially with nodule 214, then interference occurs. During insertion and extraction of filter element 100 in filter head 200, filter element 100 can be rotationally positioned such that a finger 128 of second end finger 126 is to a first side of nodule 214 (designated by "X") or to a second side of nodule 214 (designated by "Y"). As can be appreciated, the other fingers 116 and their lips 118 likewise fall to the side of their respective nodules 208 during installation and extraction, as well, and finger 128 and its nodule 214 are highlighted for illustrative purposes.

As such, filter element 100 is attached to the to filter head 200 by passing each lip 118 to one side or the other of a respective nodule 208, and by rotationally twisting filter element 100 about filter head 200 and about central axis 102, 206 until each finger 116 is axially aligned with a respective nodule 208. And, although six nodule/finger pairs are illustrated, it is contemplated that any number of each may be included such that axial interference is formed between lips and nodules, and such that installation may be carried out by rotation in either direction, as described herein.

Nodules 204 thereby each extend radially inward from circumferential wall 204 and each extend radially outward, such that lips 118 and nodules 208 overlap with one another such that an axial interference is caused between lips 118 and nodules 208 when each finger 116 is axially aligned with the respective nodule 208.

Referring now to FIGS. 1A and 3A, filter element 100 illustrates that each finger 116 includes a peak central surface 130 and side surfaces 132 that taper away from peak central surface 130, such that when filter element 100 is rotationally twisted about filter head 200, one of the side surfaces 132 engages against an axial or axially facing ribs 216 within cavity 202. Thus, when filter element 100 is installed within filter head 200, fingers 116 extend into cavity 202 and such that lips 118 pass to one side of nodules 208. Peak central surfaces 130 of each finger 116 thereby come into contact with respective axial ribs 216, and the rotational or twisting action that causes the ultimate axial alignment of the lips 118 with the nodules 208 is via engagement of one of the side surfaces 132 engaging against its axial rib 216 during the rotational motion of filter element 100. If filter element 100 is inserted with fingers 116 and nodules 208 only partially aligned, then lips 118 of fingers 116 encounter nodules 208, causing a natural "feel" (for the installer) to want to turn or rotate filter element 100 so that lips 118 can pass by nodules 208. Pressing down thereby causes peak central surfaces 130 of fingers 116 to engage with axially facing ribs 216 to lock filter element 100 with filter head 200.

As discussed, it is contemplated that fingers 116 are fabricated from a rigid material such as plastic, and that forcible insertion or removal of the filter element 100 from filter head 200 could result in fingers 116 being caused to fracture. However, it is also contemplated that forcible insertion of filter element 100 into filter head 200 may not cause such fracturing to occur, according to one example of the disclosure.

In this example, fingers 116 are fabricated from a material that allows for elastic deformation of fingers 116, in the event that filter element 100 is forcibly inserted into filter head 200.

Figure 1B:
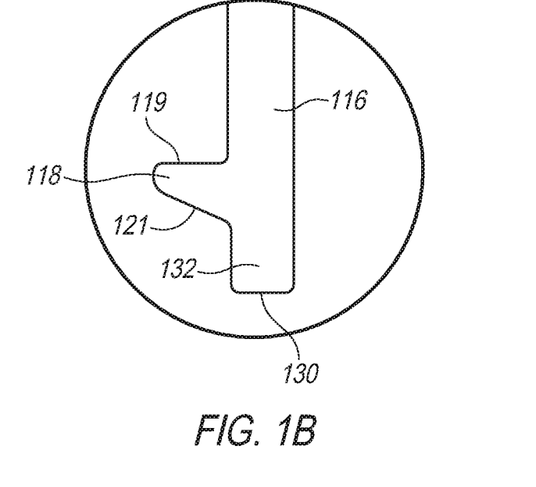
FIG. 1B shows a cross-sectional view of a finger and lip extending therefrom.
Figure 3B:
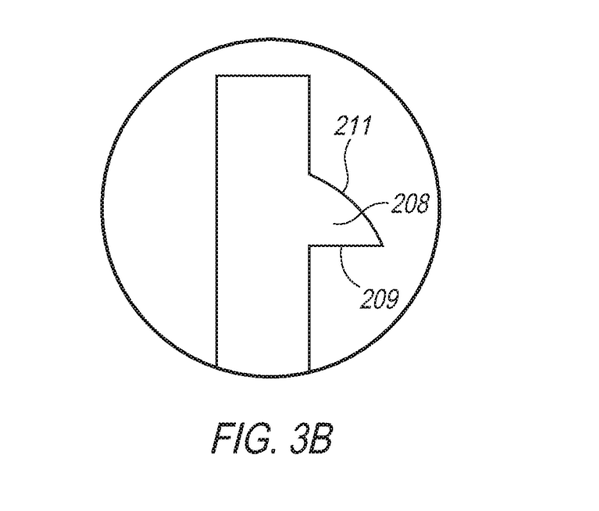
FIG. 3B shows a cross-sectional view of a nodule extending from a circumferential wall of a filter head.

FIG. 1B, a cross-sectional view of one of fingers 116 and its lip 118 extending therefrom is illustrated. Lip 118 includes a flat surface 119 that is orthogonal to central axis 102, and lip 118 includes an angled surface 121 that is angled with respect to both flat surface 119 and with respect to central axis 102. Likewise, referring now to FIG. 3B, a cross-sectional view of one of nodules 208 extending from circumferential wall 204 of filter head 200 is shown. Each nodule 208 includes its own flat surface 209 and angled surface 211. Thus, referring to both FIGS. 1B and 3B, it can be appreciated that forcibly pressing each lip 118 of filter element 100 past its respective nodule 208, having finger 116 aligned with nodule 108, would force surface 121 of lip 118 to engage with surface 211 of nodule 208, resulting in flexure of finger 116. In this example, finger 116 being of sufficient design to remain in elastic mode during such flexure, thus enables insertion of filter element 100 onto filter head 200 without fracturing fingers 116. Thus, although it may not be preferable, such forcible insertion thereby avoids catastrophic failure of the fingers 116 by allowing the angled surfaces 121, 211, to pass by one another due to mild flexure of fingers 116. However, once filter element 100 is inserted onto filter head 200 (either by the insertion and twisting action describe above, or by elastic deformation of fingers 116), then once fingers 116 and nodules 204 are aligned removal thereof is substantially inhibited due to the engagement of flat surfaces 119 of lips 118 with flat surfaces 209 of nodules 208. Thus, even in a design where fingers 116 are able to tolerate elastic deformation of fingers 116 if "forcibly" inserted past nodules 208, then lips 118 and nodules 208 lock against each other via flat surface 119, 209.

As such, filter element 100 may be inserted by offsetting fingers 116 from nodules 208, and engaging peak central surfaces 130 with axial ribs 216 while causing a rotational motion against side surfaces 132 to align fingers 116 and nodules 208, or fingers 116 may be forcibly pressed such that lips 118 pass over nodules 208 via flexure of fingers 116. But, once engaged, removal of filter element 100 from filter head 200 is via rotation of the two with respect to one another to 'unalign' the fingers and the nodules. Thus, there is a natural inclination to insert and remove filter element 100 to and from filter head 200, because a mechanic or installer will have a 'feel' for the device by naturally finding the least obstructive way to install and remove without excessive force.

Figure 4:
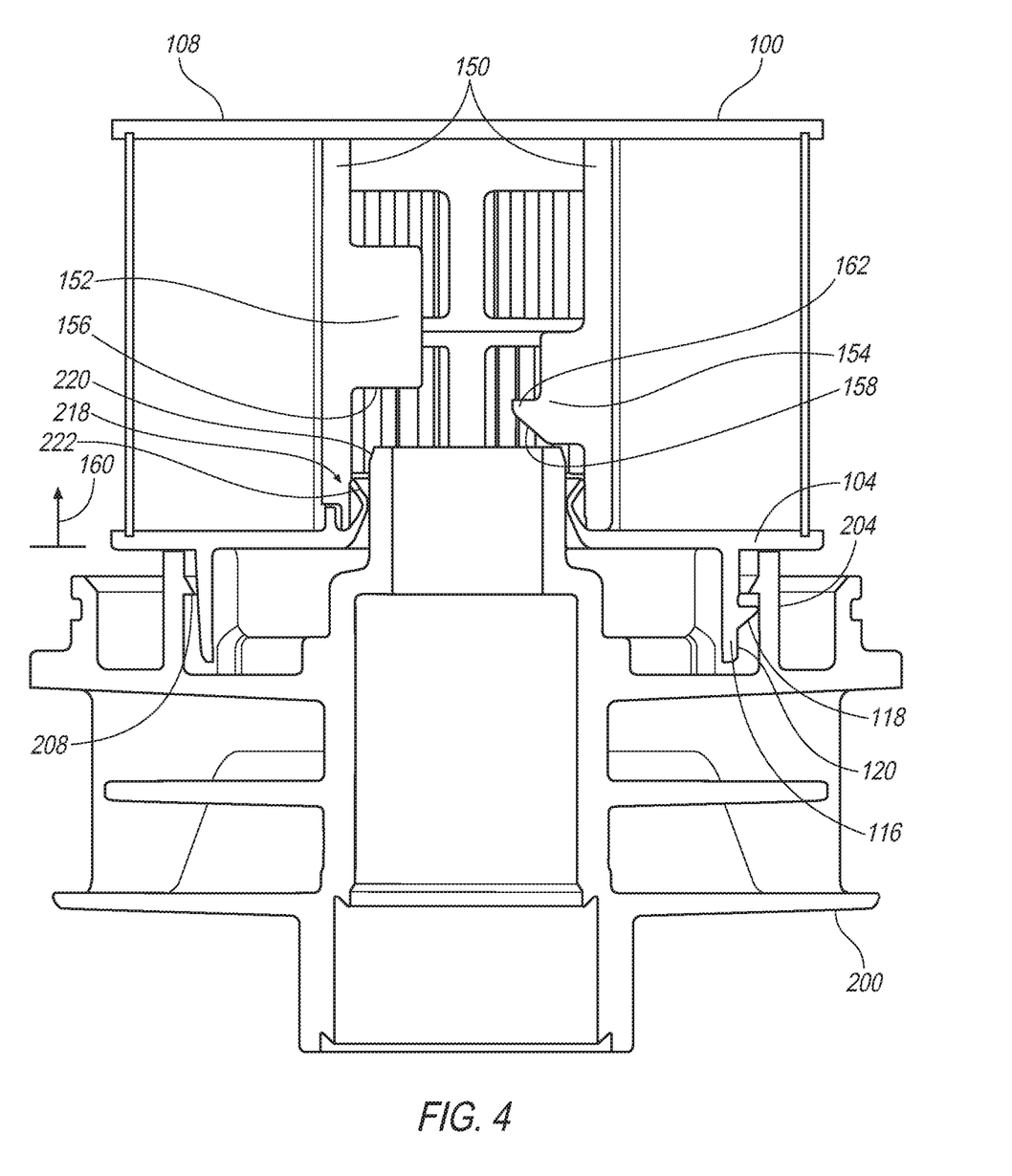
FIG. 4 shows a cross-sectional view of the filter element positioned with respect to the filter head.

FIG. 4 shows a cross-sectional view of filter element 100 positioned with respect to filter head 200. Filter element 100 includes an inner support structure 150 that is positioned within axial passageway 114 of filter material 112, inner support structure 150 including a first inner extension 152 and a second inner extension 154, first inner extension 152 having a first surface 156 at a first axial location as defined by axial direction 160, and second inner extension 154 having a second surface 158 at a second axial location as defined by axial direction 160, both first surface 156 and second surface 158 facing toward first endplate 104. In addition, a seal 218 is chamfered to engage against a leading ramped surface 220 of filter head 200, provides centering guidance between filter 100 and filter head 200 during assembly and removal of filter 100. Seal 218 includes a lip 222 that is deflected when installed onto filter head 200. Lip 222 creates a seal between the clean and dirt side of filter material 112. Seal 218 will also create frictional forces due to the infliction of lip 222 and pressure biased against filter head 200. These frictional forces created by seal 218 resist movement between filter 100 and filter head 200. However, fingers 116 with angled side surfaces 132 of filter 100 engaging against ribs 216 provide a mechanical advantage that allows for easier insertion and removal of filter 100 from filter head 200 and assist to overcome such frictional forces of seal 218. Seal 218 may be of various designs, shapes and geometry, and the resistance is common due to high frictional forces between the polymeric materials of the seal and the engaged sealing surface. This friction adds to a resistance force to movement between filter 100 and filter head 200. Therefore seal 218 is one illustrative example, and may optionally be a seal of any design with the sufficient engagement to maintain the clean fluid sealed and separated from the dirty fluid on the other side of filter material 112. For example, the seal may include various designs, such as O-rings, other lip seals, or seal geometry for the specific application of the filter 100.

Figure 5:
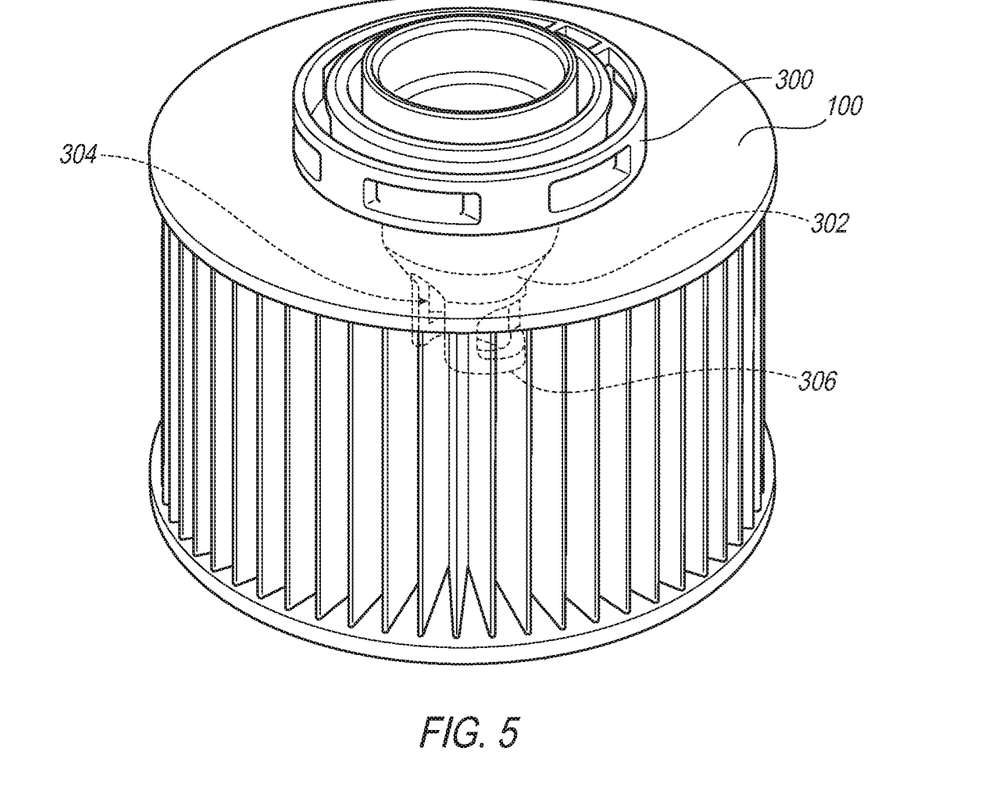
FIG. 5 shows a perspective view of the filter element having a function carrier positioned thereon.
Figure 6:
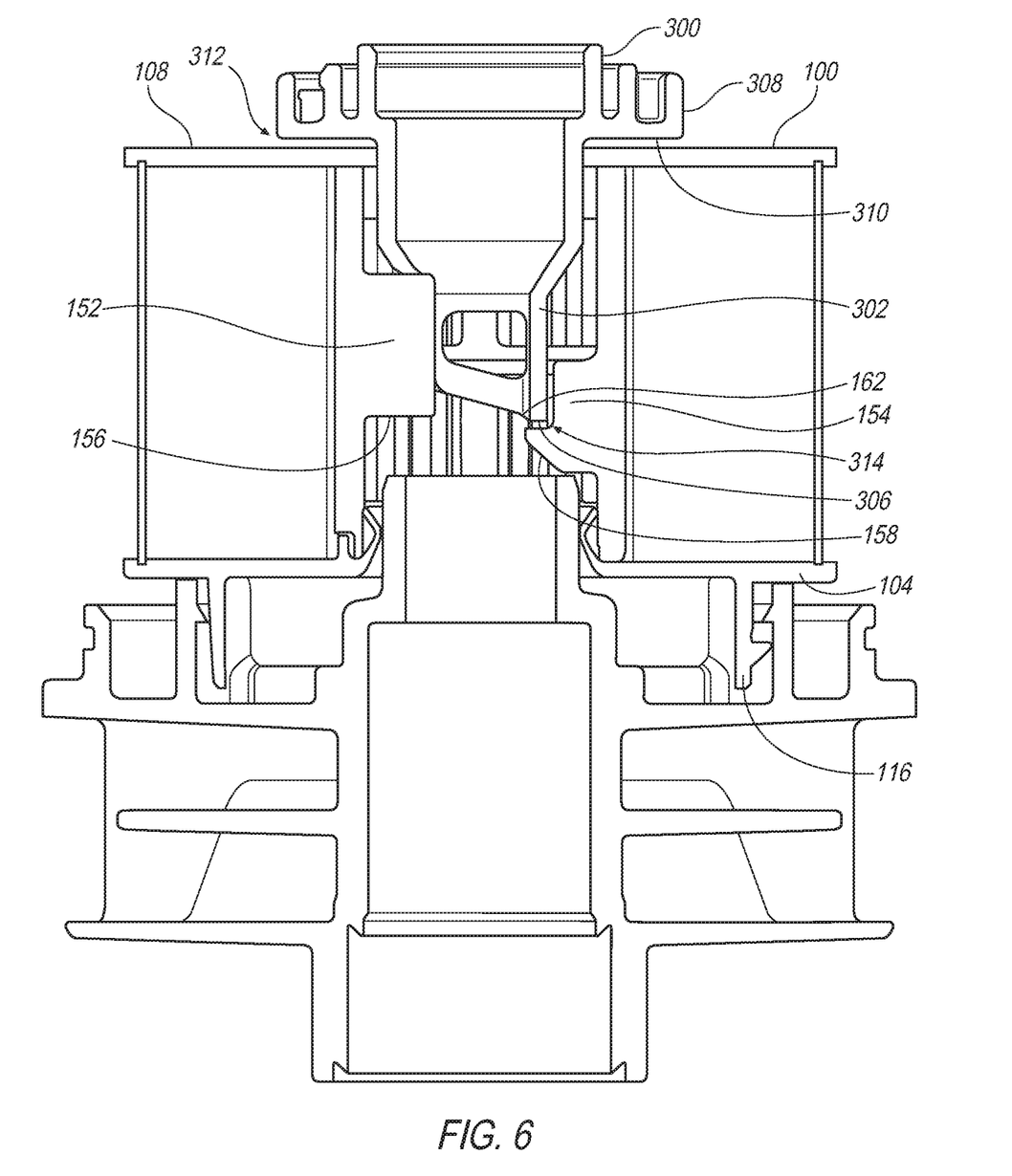
FIG. 6 shows a cross-sectional view of filter element having a function carrier positioned thereon.

FIG. 5 shows a perspective view of filter element 100 having a function carrier 300 positioned thereon, and FIG. 6 shows a cross-sectional view of filter element 100 having function carrier 300 positioned thereon. Function carrier 300 includes a number of purposes, one of which is to enable axial pressure to be asserted against filter element 100 when, for instance, function carrier 100 is properly inserted and engagement is via a number of spring-loaded elements positioned thereon (spring-loaded elements not shown in FIGS. 5 and 6). In such fashion, function carrier 300 causes an axial force to be to filter element 100 such that filter element 100 is pressed against filter head 200 and engaged therewith. The axial positioning thereby causes proper engagement of inlet and outlet holes between filter element 100 and filter head 200, which thereby maintains a positive pressure during use of filter element 100 and as fluid passes therethrough. Such arrangement (positive pressure of spring elements) is further illustrated and described in FIG. 9.

Referring still to FIGS. 5 and 6, filter element 100 is positioned such that first inner extension 152 and second inner extension 154, including their respective axial surfaces 156, 158, are facing down and away from function carrier 300. Function carrier 300 itself includes an extension 302 that includes a gap 304 along one axial side or surface, and an axial or downward surface 306 that is approximately 180° offset from gap 304. As such, when filter element 100 is properly installed in filter element 100, as shown in FIGS. 5 and 6, then gap 304 spans or sits to the side of first inner extension 152. Second inner extension 154 of filter element 100 includes, as previously discussed, second surface 158, which in the illustrated example is angled at approximately 45° with respect to central axes 102, 206. Second inner extension 154 also includes a third surface 162 that is opposite second surface 158, and when function carrier 300 is properly installed on and within filter element 100, then a gap is formed between downward surface 306 of function carrier 300 and third surface 162. In the illustrated example there is no axial pressure applied between downward surface 306 and third surface 162. Instead, pressure is applied between function carrier 300 and filter element 100 via a head portion 308, and particularly a surface 310 of head portion 308, against second endplate 108 (shown having a gap 312 therebetween for illustrative purposes only. In other words, application of downward force of function carrier 300 will cause surface 310 to engage against the top surface of second endplate 108, and a gap 314 will thereby be maintained between downward surface 306 and third surface 162.

Figure 7:
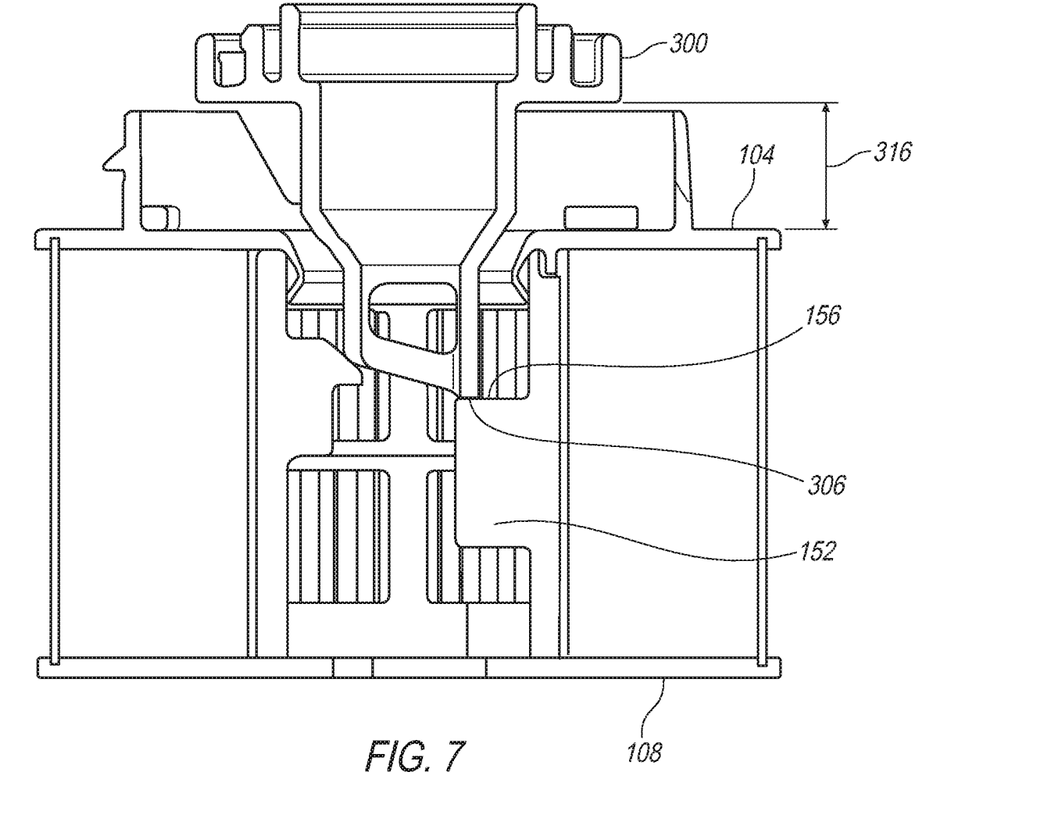
FIG. 7 illustrates the function carrier installed into the filter element, but in the wrong orientation with respect to each other.

Function carrier 300 also serves to ensure proper installation of function carrier 300 with respect to filter element 100. FIG. 7 illustrates function carrier 300 installed into filter element 100, but in the wrong orientation with respect to each other. As seen in FIG. 6, function carrier is installed such that extension 302 passes through second endplate 108 and, as described, so that heat portion 308 ultimately may be caused to engage with second endplate 108. However, if the components are not properly installed, such as in FIG. 7 when function carrier 300 and its extension 302 in particular is caused to pass improperly through first endplate 104 instead, then downward surface 306 of is caused to engage with first surface 156 of first inner extension 152. In such fashion, an installer or mechanic is prevented from mistakenly installing filter element 100 and function carrier 300 in the wrong orientation with respect to each other, because a relatively large and noticeable gap 31$p$6 is formed when downward surface 306 engages with first surface 156 of first inner extension 152.

Thus, when function carrier 300 is inserted (incorrectly, as in FIG. 7) through first endplate 104, then axial surface 306 of function carrier 300 interferes with third surface 162 of second inner extension 154. And, when function carrier 300 is inserted through second endplate 108, then axial surface 306 of function carrier 300 does not interfere with any surfaces of second inner extension 154.

Thus, according to the disclosure, a method of fabricating a filter 100 for an engine includes positioning a filter material 112 between a first endplate 104 and a second endplate 108, the filter material 112 having an axial passageway 114 extending therebetween and along a central axis 102 of filter 100, axial passageway 114 axially aligned with first central aperture 106 of first end plate 104 and with second central aperture 110 of second endplate 108, and forming a plurality of fingers 116 to first endplate 104 and positioned circumferentially about central axis 102 and extending parallel therewith, each finger 116 having a lip 118 that extends from a surface 120 of its respective finger 116 for axial engagement with a respective nodule 208, of a plurality of nodules, of a filter head 300.

Figure 8:
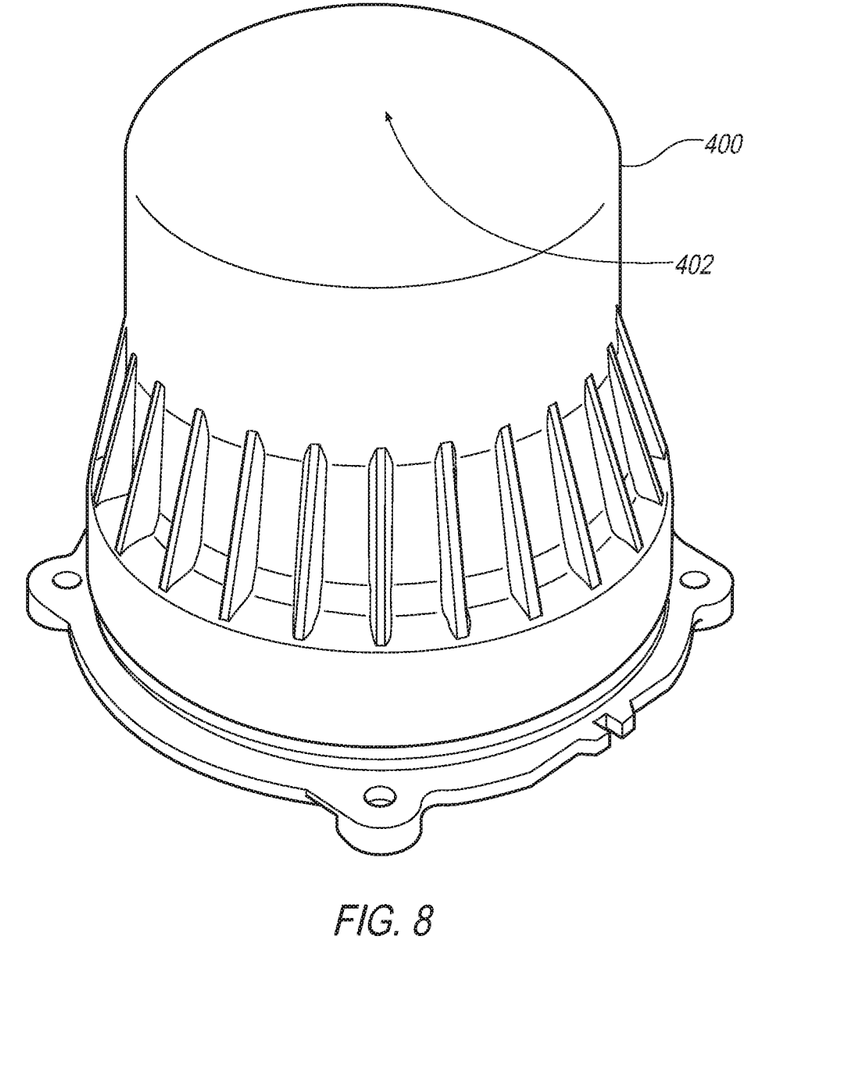
FIG. 8 illustrates a cover or cap for positioning over a filter and its other components.
Figure 9:
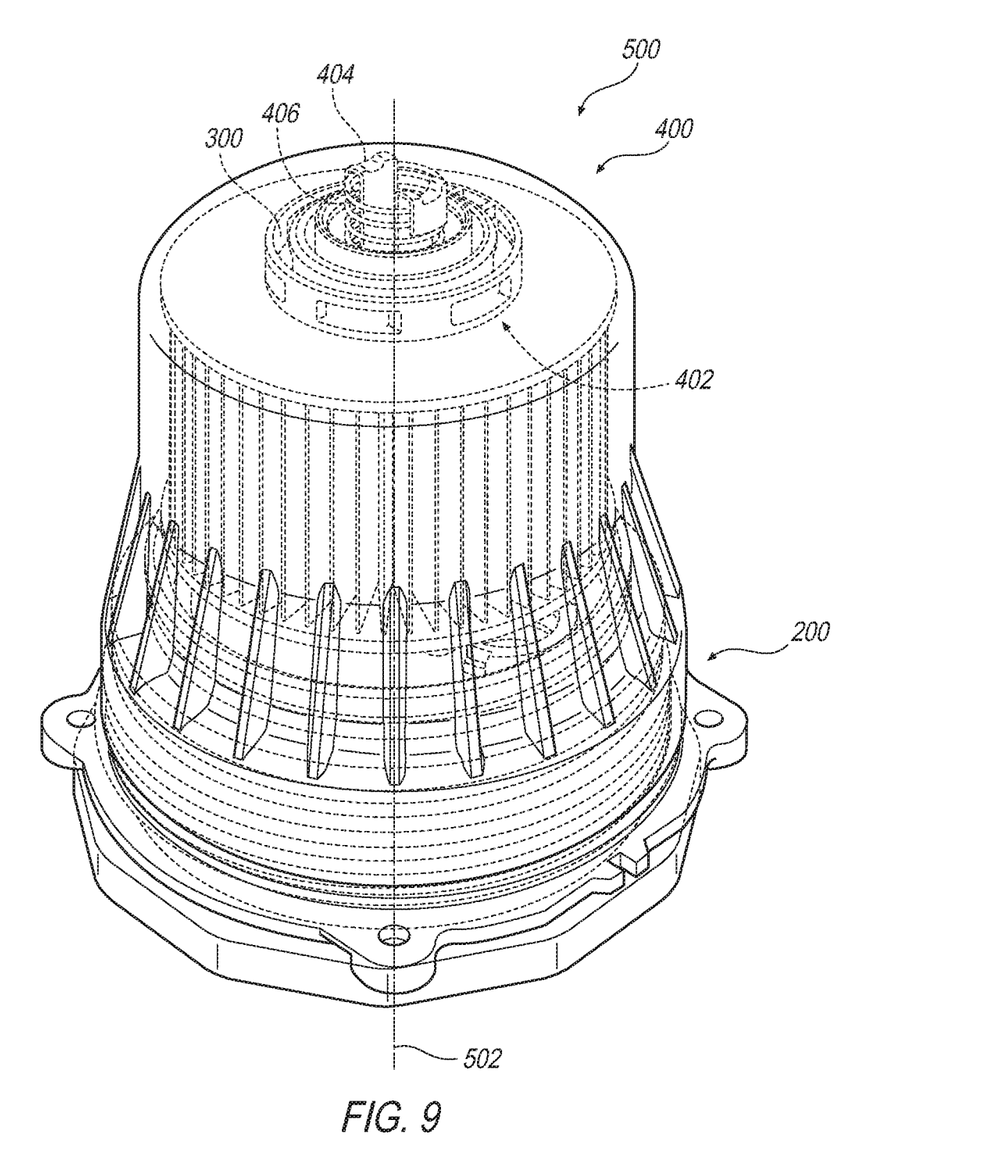
FIG. 9 illustrates select components of an assembly positioned within a cover or cap.

FIG. 8 illustrates a cover or cap 400 for positioning over a filter and its other components. FIG. 9 illustrates select components of an assembly positioned within a cover or cap. Cap 400 not only seals against leakage, by screwing or otherwise securing tight against an engine block, for example, but cap 400 also includes an inner surface 402 that causes pressure to be brought against components of function carrier 300, shown in phantom, which may include a contact component 404 and a spring element 406, which may impart a positive or downward force against filter or filter element 100 as described.

Referring to FIG. 9, a filter assembly 500 corresponds with previously described filter or filter element 100, filter head 200, and function carrier 300. Filter assembly 500 includes a central axis 502, a filter element 100, and a filter head 200 as described hereinabove.

Figure 10:
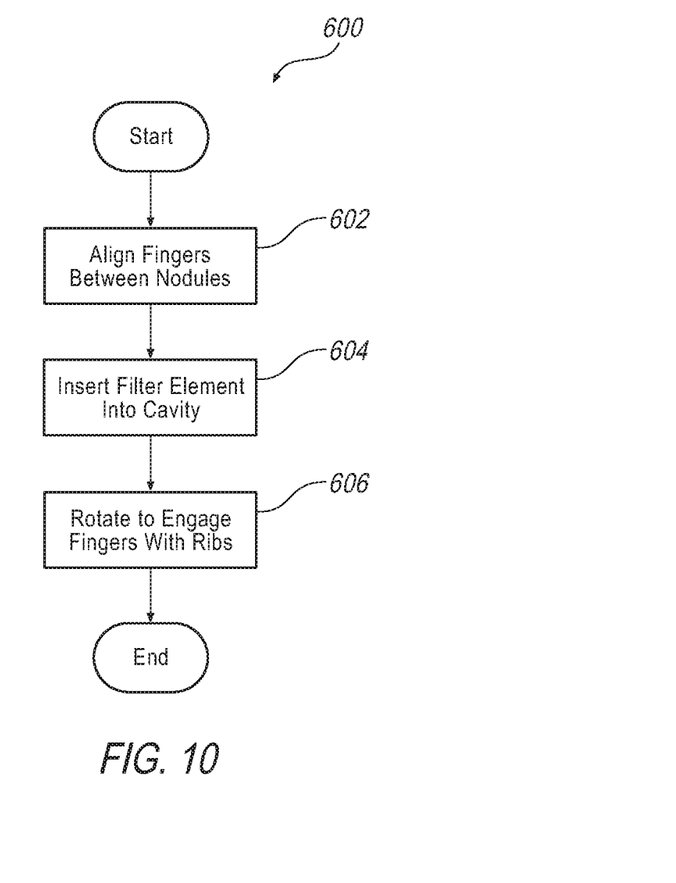
FIG. 10 illustrates a block diagram of steps for inserting a filter element into a filter head.

FIG. 10 illustrates a block diagram of steps for inserting a filter element into a filter head. Process 600 begins and at step 602 fingers 116 are aligned between nodules 208 of filter head 200. Once aligned, at step 604 fingers 116, and particularly lips 118, are pressed past nodules 208 until peak central surfaces 130 of fingers 116 engage with respective axial ribs 216. Once engages, filter element 100 is rotated such that side surfaces 132 engage against axial ribs 216 while fingers 116 penetrate further into cavity 202 of filter head 200. Rotation is completed when lips 118 are aligned with nodules 208 and a natural "feel" results in a sense that filter element 100 and filter head 200 are properly aligned. Such "feel" develops because, continued turning will thereby engage the other of side surface 132 against ribs 216, and filter element 100 will begin to pull away or out of cavity 202 with continued engagement. Such step also illustrates the proper removal of filter element 100 from filter head 200, such as upon a desire to change out an old or used filter element, and the filter element is simply rotated to engage components as described until filter element 100 may be removed when lips 118 are no longer aligned with nodules 208. In addition, as already discussed above, the frictional forces between seal 218 and filter head 200 are more easily overcome due to the mechanical advantage and guidance interaction between side surfaces 132 of finger 116 engaging against the rounded surface of ribs 216 of filter head 200.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain arrangements, and should in no way be construed so as to limit the claimed invention.

Accordingly, it is to be understood that the above description is intended to be illustrative and not restrictive. Many applications other than the examples provided would be upon reading the above description. It is anticipated and intended that future developments will occur in the arts discussed herein, and that the disclosed systems and methods will be incorporated into such future arrangements. In sum, it should be understood that the invention is capable of modification and variation.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A filter element having a central axis, comprising:
a first endplate having a first central aperture;
a second endplate having a second central aperture;
a filter material positioned between the first endplate and the second endplate and having an axial passageway extending therebetween and along the central axis, the axial passageway axially aligned with the first central aperture and the second central aperture; and
a plurality of fingers attached to the first endplate and positioned circumferentially about the central axis and extending parallel therewith, each finger having a lip that extends from a surface of its respective finger for axial engagement with a respective nodule, of a plurality of nodules, of a filter head,
wherein the lip of each respective finger extends radially outward, such that the filter element is attached to the to the filter head by passing each finger to one side or the other of a respective nodule, and by rotationally twisting the filter element about the filter head and about the central axis until each finger is axially aligned with a respective nodule;
wherein the nodules each extend radially inward and the lips each extend radially outward, such that the lips and nodules overlap with one another such that an axial interference is caused between the lips and the nodules when each finger is axially aligned with the respective nodule.

2. The filter element of claim 1, wherein the filter head includes a cavity that is partially formed by a wall that extends circumferentially about the central axis, and having the plurality of nodules extend from the wall.

3. The filter element of claim 2, wherein each finger includes a peak central surface and side surfaces that taper away from the peak central surface, such that when the filter element is rotationally twisted about the filter head, one of the side surfaces engages against an axial rib within the cavity.

4. The filter element of claim 1, further comprising an inner support structure that is positioned within the axial passageway of the filter material, the inner support structure including a first inner extension and a second inner extension, the first inner extension having a first surface at a first axial location and the second inner extension having a second surface at a second axial location, both the first surface and the second surface facing toward the first endplate, such that, when a function carrier is inserted through the first endplate, then an axial surface of the function carrier interferes with the first surface.

5. The filter element of claim 4, wherein when the function carrier is inserted through the second endplate, then the axial surface of the function carrier does not interfere with either the first surface or the second surface.

6. A method of fabricating a filter for an engine, comprising:
   positioning a filter material between a first endplate and a second endplate, the filter material having an axial passageway extending therebetween and along a central axis of the filter, the axial passageway axially aligned with a first central aperture of the first end plate and with a second central aperture of the second endplate;
   forming a plurality of fingers to the first endplate and positioned circumferentially about the central axis and extending parallel therewith, each finger having a lip that extends from a surface of its respective finger for axial engagement with a respective nodule, of a plurality of nodules, of a filter head; and
   attaching the lip of each respective finger to extend radially outward, such that the filter element is attached to the to the filter head by passing each finger to one side or the other of a respective nodule, and by rotationally twisting the filter element about the filter head and about the central axis until each finger is axially aligned with a respective nodule;
   wherein the nodules each extend radially inward and the lips each extend radially outward, such that the lips and nodules overlap with one another such that an axial interference is caused between the lips and the nodules when each finger is axially aligned with the respective nodule.

7. The method of claim 6, wherein the filter head includes a cavity that is partially formed by a wall that extends circumferentially about the central axis, and having the plurality of nodules extend from the wall.

8. The method of claim 7, further comprising forming each finger having a peak central surface and side surfaces that taper away from the peak central surface, such that when the filter element is rotationally twisted about the filter head, one of the side surfaces engages against an axial rib within the cavity.

9. A filter assembly having a central axis, comprising:
   a filter element comprising:
   a first endplate having a first central aperture;
   a second endplate having a second central aperture;
   a filter material positioned between the first endplate and the second endplate and having an axial passageway extending the re between and along the central axis, the axial passageway axially aligned with the first central aperture and the second central aperture; and
   a plurality of fingers attached to the first endplate and positioned circumferentially about the central axis and extending parallel therewith, each finger having a lip that extends radially outward from a surface of its respective finger;
   a filter head having a cavity that is partially formed by a wall that extends circumferentially about the central axis, and having a plurality of nodules extending from the wall;
   wherein the filter element is attached to the to the filter head by passing each finger to one side or the other of a respective nodule, and by rotationally twisting the filter element about the filter head and about the central axis until each lip is axially aligned with a respective nodule;
   wherein the nodules each extend radially inward and the lips each extend radially outward, such that the lips and nodules overlap with one another such that an axial interference is caused between the lips and the nodules when each finger is axially aligned with the respective nodule.

10. The filter assembly of claim 9, wherein the nodules are positioned on an inner surface of the wall.

11. The filter assembly of claim 9, wherein the filter element includes an axial protuberance that extends axially into the cavity, the axial protuberance having a filter exit passageway passing therethrough.

12. The filter assembly of claim 11, wherein the fingers are positioned in uniform spacing circumferentially about the central axis, and a gap informed between two of the fingers such that the axial protuberance is positioned in the gap when each finger is axially aligned with the respective nodule.

13. The filter assembly of claim 9, wherein the filter head includes a plurality of axially facing ribs that extend radially from proximate the cavity to an inner wall of the cavity.

14. The filter assembly of claim 13, wherein each finger includes a peak central surface and side surfaces that taper away from the peak central surface, such that when the filter element is rotationally twisted about the filter head, one of the side surfaces engages against one of the axially facing ribs within the cavity.

15. The filter assembly of claim 9, wherein the filter element further comprises an inner support structure that is positioned within the axial passageway of the filter material, the inner support structure including a first inner extension and a second inner extension, the first inner extension having a first surface at a first axial location and the second inner extension having a second surface at a second axial location, both the first surface and the second surface facing toward the first endplate, such that, when a function carrier is inserted through the first endplate, then an axial surface of the function carrier interferes with one or both of the first surface and the second surface.

16. The filter assembly of claim 15, wherein when the function carrier is inserted through the second endplate, then the axial surface of the function carrier does not interfere with either the first surface or the second surface.

* * * * *